United States Patent [19]
Chisum

[11] 3,910,606
[45] Oct. 7, 1975

[54] WRENCHLESS TRAILER TO CAB CONNECTOR

[76] Inventor: Finis Lavell Chisum, P.O. Box 1145, Claremore, Okla. 74107

[22] Filed: Nov. 15, 1974

[21] Appl. No.: 524,087

[52] U.S. Cl............ 280/425 A; 214/85.5; 214/355; 180/7 R
[51] Int. Cl.² ........................................ B62D 53/06
[58] Field of Search..... 280/423 B, 425 A; 180/7 R; 238/14; 214/355, 354, 353, 85.5

[56] References Cited
UNITED STATES PATENTS

| | | | |
|---|---|---|---|
| 1,561,157 | 11/1925 | Greer | 214/355 |
| 2,409,398 | 10/1946 | Shoemaker | 214/355 |
| 2,687,225 | 8/1954 | Martin | 280/423 B UX |
| 2,730,376 | 1/1956 | Martin | 280/425 A |
| 3,370,726 | 2/1968 | Ijichi | 214/85.1 X |

*Primary Examiner*—Leo Friaglia

[57] ABSTRACT

Apparatus and method for attaching a trailer to a tractor truck without the use of a winch. It includes skid means attached to the back end of the truck frame resting on the ground so that the leading edge of the trailer can be pulled up the skids onto the frame and then onto the fifth wheel, where it is locked into position. The means for pulling the trailer up onto the truck frame comprises a pair of chains which are hooked into the rear dual wheels of the tractor and extend backwardly of the tractor parallel to the frame and are attached under the trailer back of the front edge. By moving the tractor forward the chains become wound on the dual wheels of the tractor, pulling the trailer forward up the skids and onto the frame and onto the fifth wheel.

14 Claims, 10 Drawing Figures

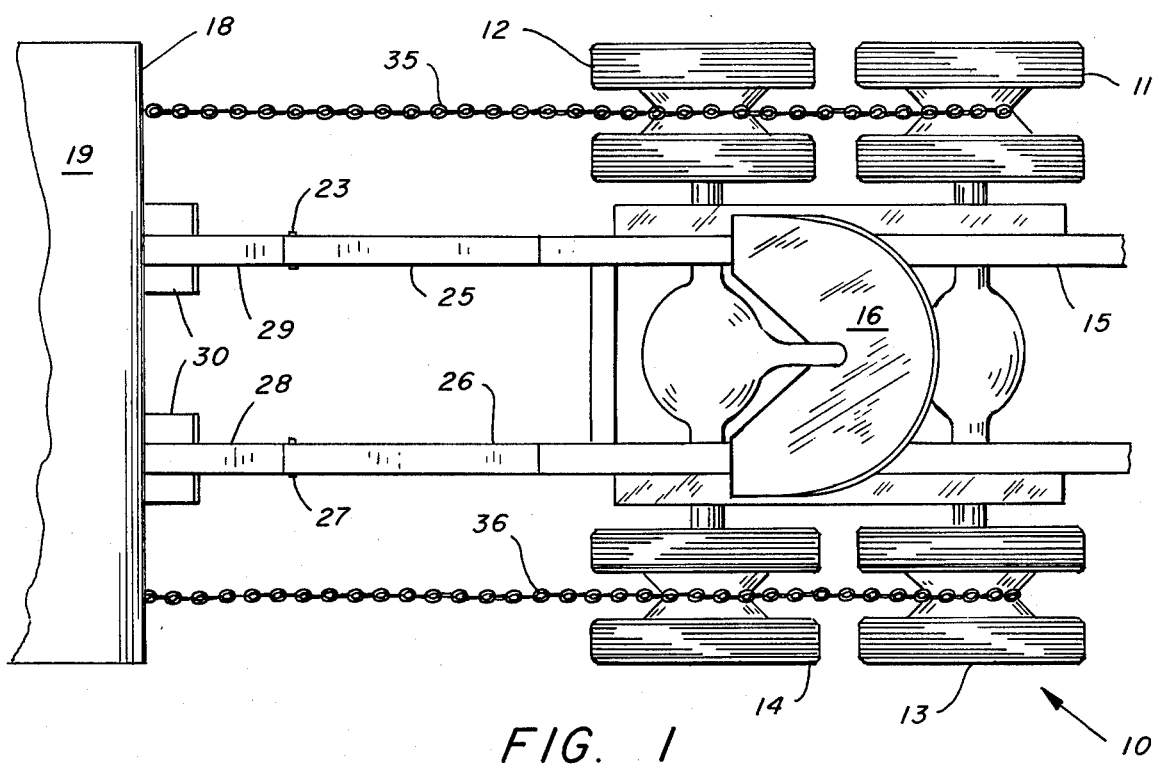
FIG. 1
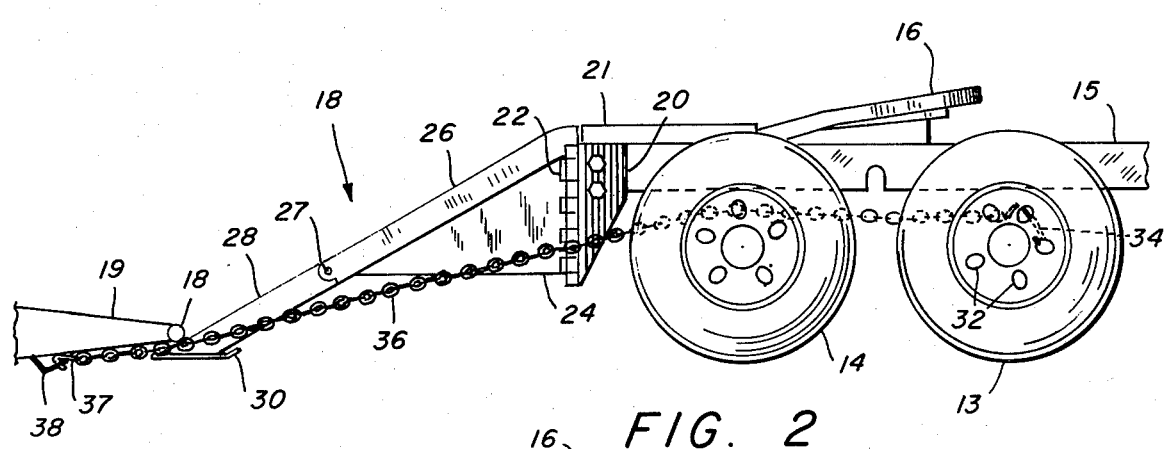
FIG. 2
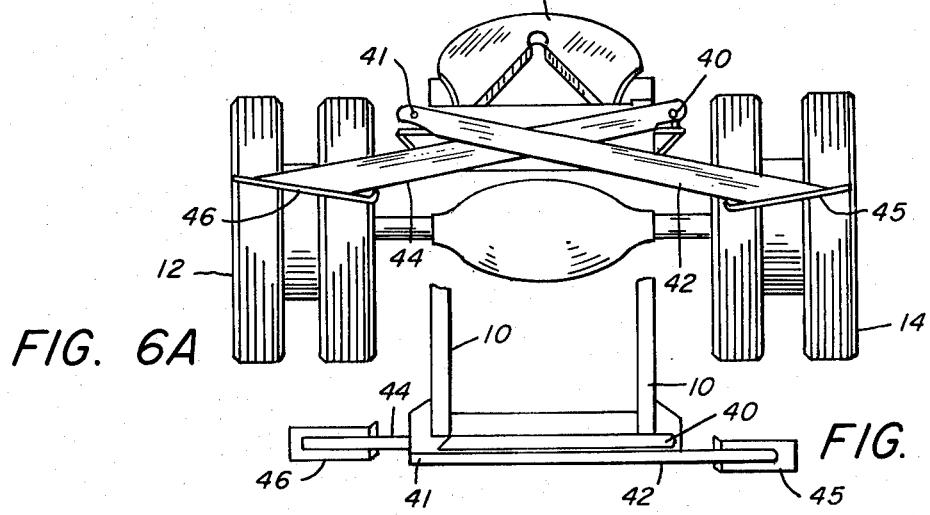
FIG. 6A
FIG. 6B

WRENCHLESS TRAILER TO CAB CONNECTOR

BACKGROUND OF THE INVENTION

This invention lies in the field of automotive truck equipment. More particularly, it involves the use of truck tractors and semi-trailers such as are well known in the art and which are supported at their front end on a fifth wheel mounted over the rear wheels of the tractor. Still more particularly, this invention relates to a method and apparatus for raising a trailer onto the fifth wheel or lowering it from the fifth wheel onto the ground, without the use of a conventional cable winch.

In the prior art the normal method of raising a semi-trailer onto the frame of the truck and onto the fifth wheel is by means of a cable winch which is mounted to the frame of the truck tractor behind the cab. The cable moves backward over a long roller supported at the back edge of the truck frame and to the front end of the trailer. By turning the winch drum the trailer is pulled forward, the cable lifting it up over the transverse roller on the back of the tractor, and forward, so that it is supported on the fifth wheel.

Such winches are expensive and require expensive additions to the truck for the provision of power and control to the winch. Furthermore, they are heavy and detract from the useful load that can be carried and thirdly they occupy approximately two feet of space behind the cab so that increased length of wheel base is required for the winch.

SUMMARY OF THE INVENTION

It is a primary object of this invention to provide a power means for lifting the front end of a semi-trailer and positioning it on top of a fifth wheel of a truck tractor. It is a further object of this invention to provide a means for mounting and dismounting the front end of a semi-trailer onto a fifth wheel of a truck tractor without the use of a winch.

These and other objects are realized and the limitations of the prior art are overcome in this invention by providing a pair of sloping skids which are attached to the back end of the truck frame and rest on the ground. A pair of chains which are attached under the front edge of the semi-trailer are hooked to holes in the dual wheels on opposite sides of the truck so that when the truck is driven forward the chains will wrap around the wheels and will draw the trailer forward causing it to slide up the skids and onto the frame of the truck and onto the fifth wheel. By this means the use of the rear dual wheels of the truck in cooperation with chains which can be hooked into appropriate holes in the wheels, serve a similar purpose to the use of a conventional winch mounted to the tractor frame behind the cab.

BRIEF DESCRIPTION OF THE DRAWINGS

These and other objects and advantages of this invention and a better understanding of the principles and details of the invention will be evident from the following description taken in conjunction with the appended drawings, in which:

FIGS. 1 and 2 represent plan and elevation, respectively, of one embodiment of this invention.

FIGS. 6A and 6B illustrate a different type of skid construction from that shown in FIG. 3.

DESCRIPTION OF THE PREFERRED EMBODIMENT

Figure 3:
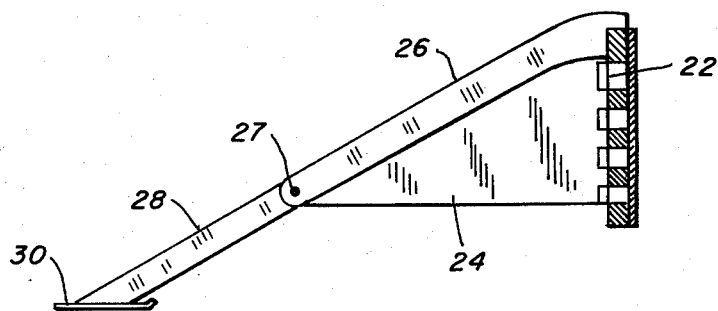
FIG. 3 illustrates a detail of FIG. 2.

Referring now to the drawings and in particular to FIGS. 1 and 2, there are shown two views of one embodiment of this apparatus. Shown is a conventional frame of a truck tractor with two sets of dual rear wheels 11 and 13 in the front pair and 12 and 14 in the rear pair. While this invention is applicable to the use of a single pair of dual wheels, it can also be used as shown with two pair of dual wheels on the tractor. A conventional fifth wheel 16 is shown schematically mounted on the frame 10. Since the use of the fifth wheel technique for supporting the front end of a semi-trailer is old and well known in the art, no detail is shown for the construction and mounting of the fifth wheel. Mounted at the rear of the truck frame 15 are two support brackets 20, one on each side of the frame. These brackets support hinges 22 which support gusset plates 24 which support a skid arm 26, which has an additional skid arm 28 hinged at 27. There is a shoe 30 attached to the portion 28 of the skid, so that with this skid in position as shown the tractor 10 can be moved forward and the skid will slide along the ground surface in the position shown in FIG. 2. This detail is shown more clearly in connection with FIG. 3. While a shoe or foot plate 30 has been illustrated to facilitate movement of the skid along the ground, a wheel, roller, or similar means could equally well be used.

With the skids 25 and 29 on the left side and 26, 28 on the right side and the foot plates 30 resting on the ground, a pair of chains 35 and 26 are laid out parallel to the truck frame, one on each side of the frame and are attached by hook means 34 into one of the holes 32 in the dual wheels 11 and 13. The back end of the chains 35 and 36 are attached to the trailer. While they can be attached to the front edge of the trailer by well known means, preferably they are hooked by hook means 37 into a bracket 38 mounted back of the front edge 18 of the semi-trailer 19. Now as the tractor 10 is driven forward, the chains will wrap themselves around the wheels 11 and 13 and thereby cause the trailer 19 to move forward. The front edge 18 will slide up the top surface of the skids 25, 29, 26 and 28, until it reaches the top end of the frame 21. With the front end of the trailer 19 resting on the back end of the truck frame 21, the brakes on the wheels of the trailer are locked or blocked and the truck is driven backwardly so that the front end 18 of the trailer will slide forward and will rest on the fifth wheel 16 where it can be locked in operating position. The backward movement of the tractor will loosen the chains so that they can be disengaged from the trailer and as the tractor is driven backwardly the chains will be unwound from the wheels and they can be removed and stowed away.

Figure 4:
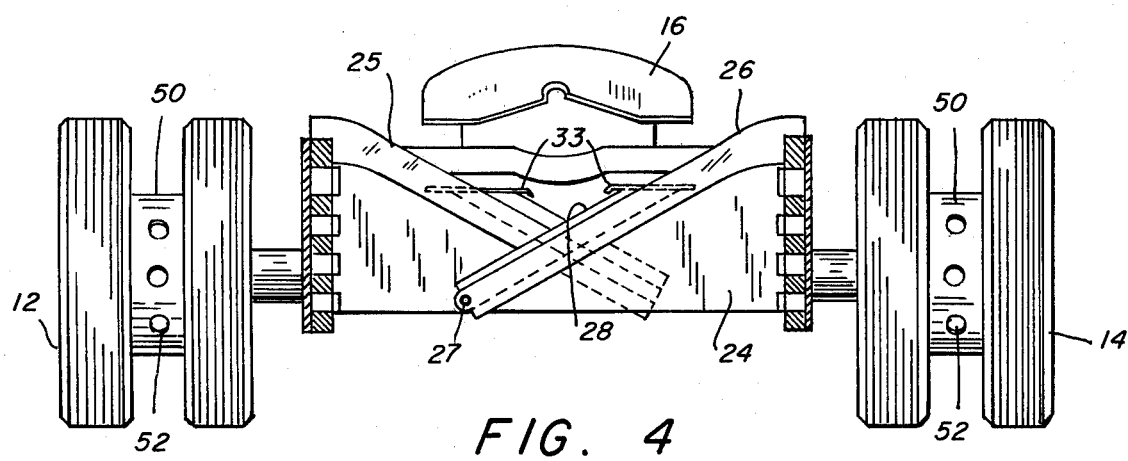
FIGS. 4 and 5 illustrate the mounting of the detail of FIG. 3 onto the back end of the truck tractor.
Figure 5:
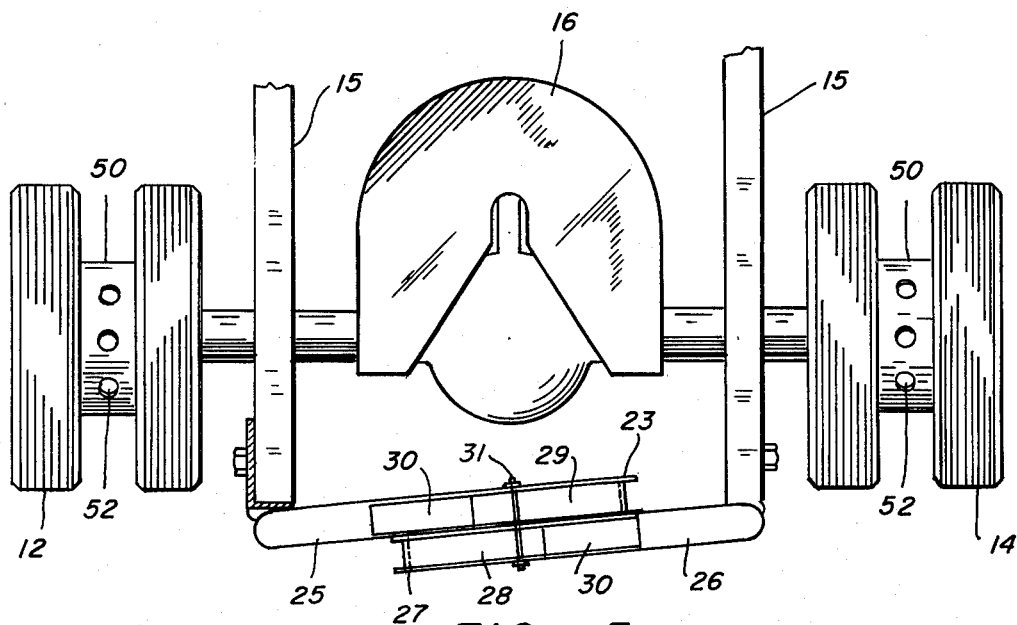

Referring now to FIGS. 4 and 5, there are two views shown of the skids 18 which are shown in folded, stowed position. The gusset plate 24 is hinged 90° until it is parallel to the back end of the tractor. The portion 28 is rotated about the hinge pin 27, the same procedure as taken with the other skid and the two folded skids are clamped by appropriate means to the back end of the truck. In FIG. 4 a rear view is shown with the fastening means 33 which can be any desired means for supporting the skids in a traveling position. FIG. 5 shows a plan view of the skids in their traveling position, with a bolt means 31 for clamping them in position for travel.

Referring now to FIGS. 6A and 6B there is shown a second embodiment of the skids which comprise single long portions 42 and 44 which are hinged at their upper ends at points 40 and 41 to the rear end of the frame. These are universal hinges, so that they can be rotated and moved around as desired. Plates 45 and 46 are provided as in the case of FIGS. 1 and 2. Again, appropriate means can be provided for supporting the skids 42 and 44 in the traveling position. No detail is provided for the support means and such support means do not form any part of this invention.

Figure 7:
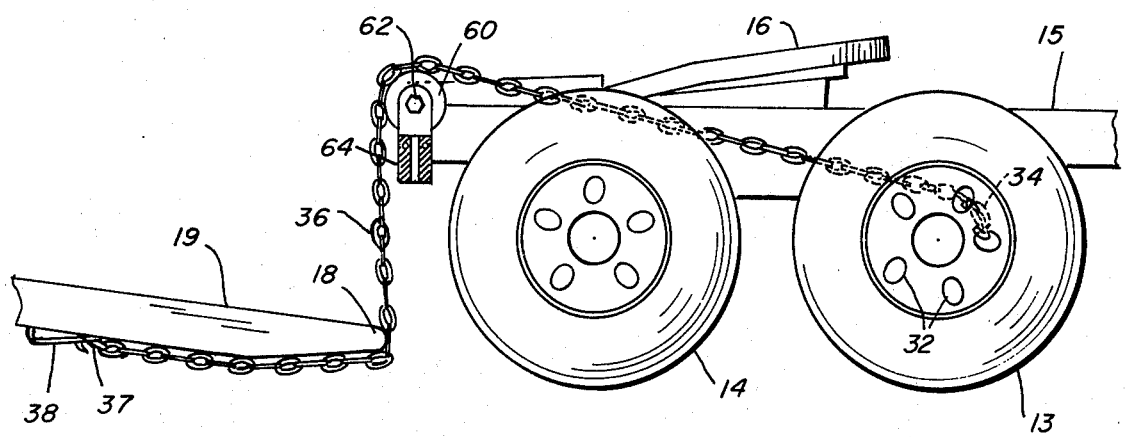
FIGS. 7, 8 and 9 illustrate a second embodiment of this invention which operates without the use of skids.
Figure 8:
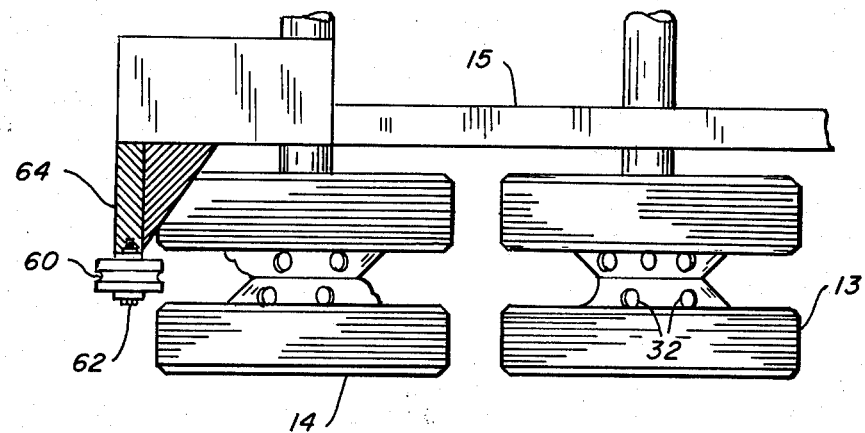
Figure 9:
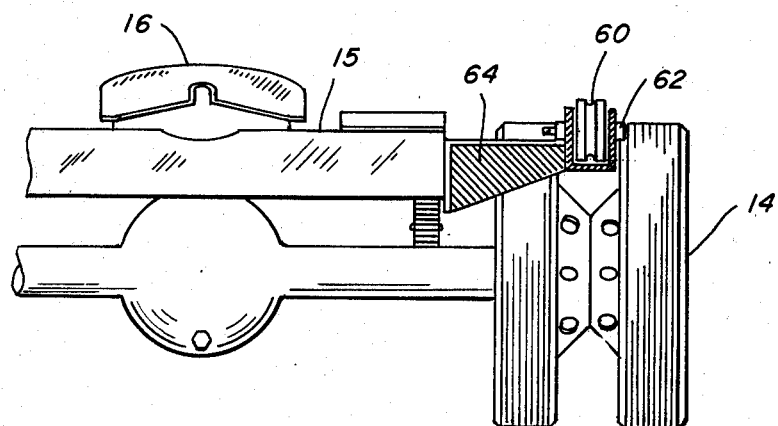

Referring now to FIGS. 7, 8 and 9, there is shown a second embodiment of this invention in which the chains are used as the power source for drawing the front end of the semi-trailer up onto the frame and onto the fifth wheel. However, no skids are required as in the case of FIGS. 1 and 2. In the embodiment of FIGS. 7, 8 and 9, there are two brackets 64 mounted one on each side of the frame at the rear end. These support at their outer ends pulleys 60, which are journalled in bearings 62. The pulleys 60 are aligned substantially with the joints between the two wheels of the dual wheels 13 and 14, for example. The rear ends of the chains are attached to the semi-trailer. While they can be attached to the front edge of the trailer by means well known in the art, preferably they are hooked into the brackets 38 by means 37 under the front end 18 of the semi-trailer 19 and chain 36 is passed over the pulley 60, and the front end 34 is hooked into one of the holes 32 in the wheel 13 or 14. The truck can now be driven forward and the chain 36 will be pulled forward and will wind up on the wheel 13, causing the front end 18 of the trailer 19 to be lifted up to a level above that of the back end of the frame 15. With the trailer resting on the back end of the frame as before, the wheels of the trailer can be blocked and the tractor can be moved backwardly until the front end of the trailer rests on the fifth wheel 16 in the customary manner.

Referring back to FIGS. 1 and 2 the dual wheels are shown with an appropriate dish so that they can be fastened in contact with each other onto the studs of the hub on the axle of the truck. The so-called "Budd" wheels manufactured by the Budd Company are provided with openings 32 in the wheels into which the chain hooks 34 can be attached.

There are other types of wheels which require a short cylindrical spacer 50, as shown in FIGS. 4 and 5. These are short sections of cylindrical tubing or pipe and are normally not provided with holes. However, to be used in this manner holes 52 must be cut into the spacers 50 so that the chains can be hooked into the spacers so that they will wind up around the wheels as the truck is moved forward.

While the description of the invention has been made in terms of chains 35 and 36, it is equally possibe, of course, to use other flexible tension means such as cables or straps or other devices of sufficient tensile strength and flexibility. Also, it is desirable to have wheels and spacers wherein there are a sufficiently large number of openings into which the tension members can be hooked, so that when the chains or other tension members are attached to the trailer and to the wheels they will be substantially equal in length and the trailer will be pulled directly forward without any skew position.

The description of the operation of raising the semi-trailer and mounting it on the tractor has been gone through in considerable detail. The reverse operation of lowering the trailer to the ground is carried on in a similar way. If the embodiment of FIGS. 1 and 2 is used, the skids 18 are pointed to the back of the tractor, the king pin is removed from the fifth wheel and the truck is slowly moved forwardly after the wheels of the trailer have been blocked. The trailer will then remain in position as the truck moves forward and the front end 18 of the trailer will slide down onto the truck frame and onto the skids and then onto the ground.

With the embodiment of FIGS. 7, 8 and 9, to lower the trailer to the ground the chains are hooked to the wheels and the truck is moved forward sufficiently to wrap the chains around the wheels about three wraps. Now, the trailer wheels are blocked and the king pin is uncoupled and the truck drives forward until the trailer rests on the last six inches of the truck frame. The chains are now hooked at their free ends underneath the trailer leaving sufficient slack in the chains to allow the truck to move from under the trailer. The truck then is moved forward sufficient so that the trailer will drop and rest on the chains. The truck and trailer are now backed up and as the chains uncoil from the rear wheels the trailer is gently lowered to the ground.

Reference has been made to the words truck, tractor and truck tractor, all of which mean the vehicle which carries the fifth wheel to which the semi-trailer is attached. Also, while the skids are shown attached at their front end to the tractor, they could be removably attached and carried in a storage locker when not in use.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. Apparatus for mounting the front end of a semi-trailer to a tractor truck having dual rear wheels, comprising:
  a. a pair of skids attached at their first ends to the rear of the truck frame, one on each side of the frame, their second ends resting on the ground;
  b. a pair of tension members, including means to attach a first end of each tension member to a corresponding rear dual wheel of said truck; and
  c. means to fasten the second ends of said tension members to said semi-trailer, one on each side.

2. The apparatus as in claim 1 in which said skids are rotatably attached to said frame and include means to support them to the frame in a transverse position.

3. The appratus as in claim 2 in which said skids are hinged.

4. The apparatus as in claim 1 including means attached to the free ends of said skids to facilitate movement along the ground.

5. The apparatus as in claim 4 in which said means to facilitate movement comprises footplates.

6. The apparatus as in claim 4 in which said means to facilitate movement comprises rotatable means.

7. The apparatus as in claim 1 including hook means on said tension members and holes in said wheels into which said hooks can be placed.

8. The apparatus as in claim 1 including a cylindrical spacer between the wheels in each dual wheel and including openings in the walls of said spacers.

9. The apparatus as in claim 1 in which said tension members comprise chains.

10. The apparatus as in claim 1 in which said tension members comprise cables.

11. Apparatus for mounting the front end of a semi-trailer to a tractor truck, comprising:
   a. a pair of pulleys supported on shaft means in two brackets mounted to the frame of said tractor at its rear end, one on each side, the center plane of said pulleys aligned with the joints between the wheels of a dual wheel on each side;
   b. a pair of tension members of equal length including means to attach a first end of each tension member to a corresponding dual rear wheel of said truck;
   c. means to fasten the second ends of said tension members to the underside of said semi-trailer back of the front edge, one on each side; and
   d. means to pass the intermediate portions of said tension members over said pulleys.

12. The apparatus as in claim 1 in which said tension members are fastened to the underside of said semi-trailer.

13. The apparatus as in claim 12 in which said tension members are fastened back of the front edge of said semi-trailer.

14. Apparatus for mounting the front end of a semi-trailer to a tractor truck having rear wheels, comprising:
   a. a skid attached at its first end to the rear of the truck frame, its second end resting on the ground;
   b. a pair of tension members, including means to attach a first end of each tension member to a corresponding rear wheel of said truck; and
   c. means to fasten the second ends of said tension members to said semi-trailer.

* * * * *